Figure 1:
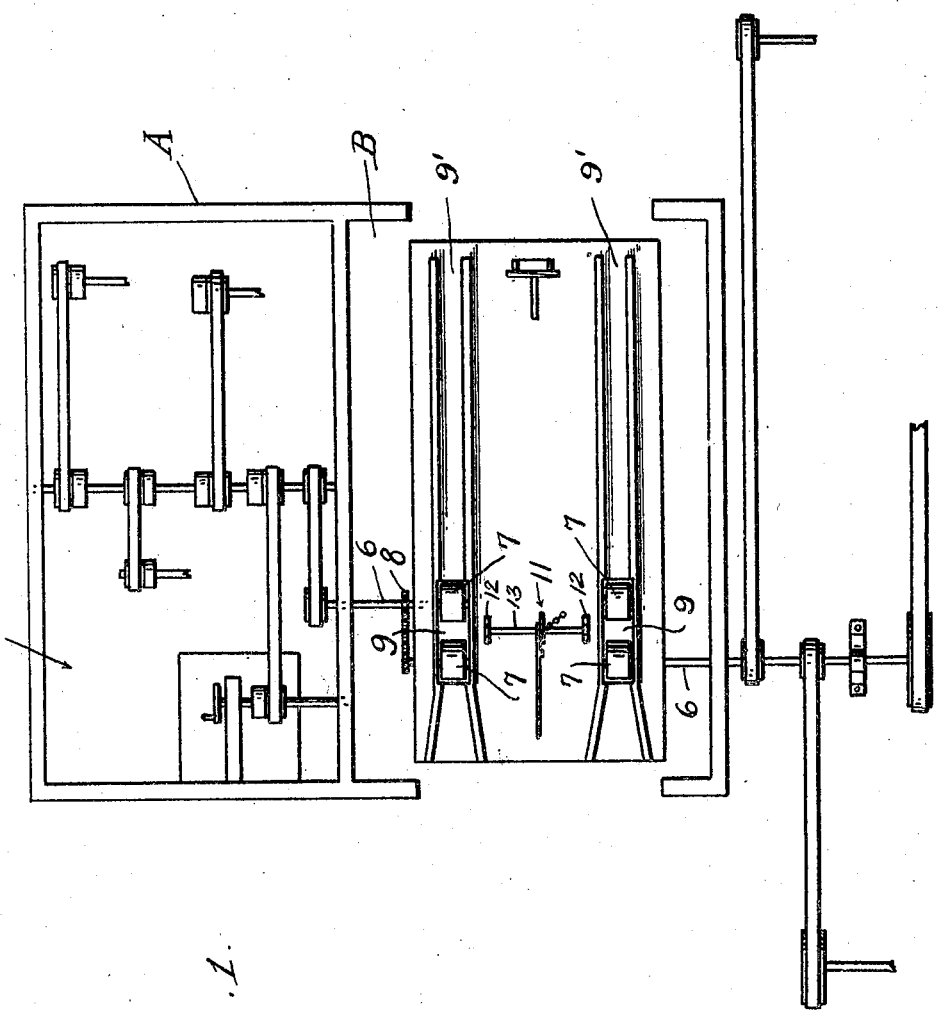

June 24, 1930.  J. W. WHITE  1,766,007
AUTOMOBILE POWER TAKE-OFF DEVICE
Filed Aug. 22, 1928   3 Sheets-Sheet 1

Inventor
J. W. White

By Clarence A O'Brien
Attorney

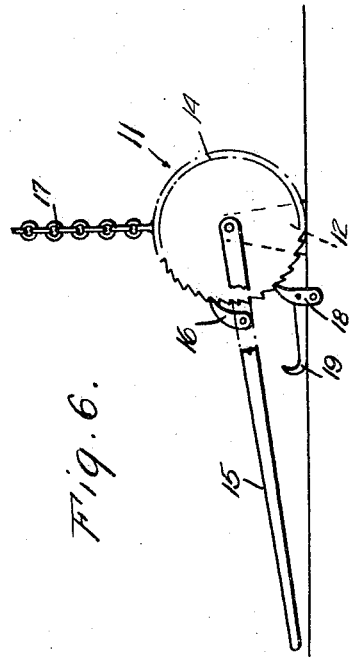
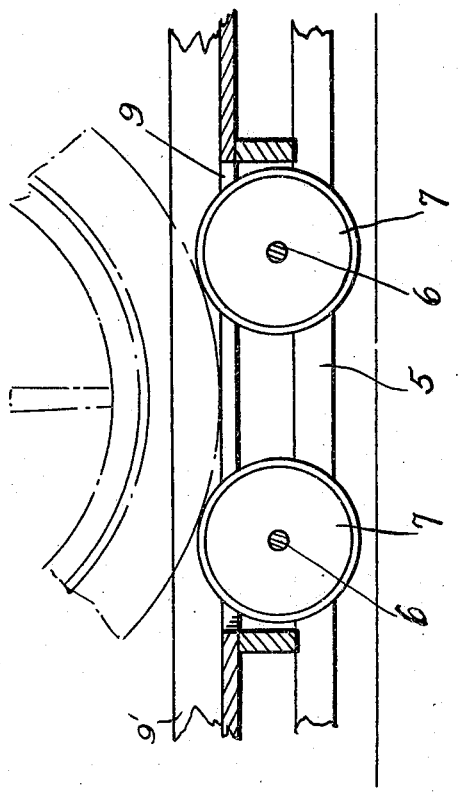
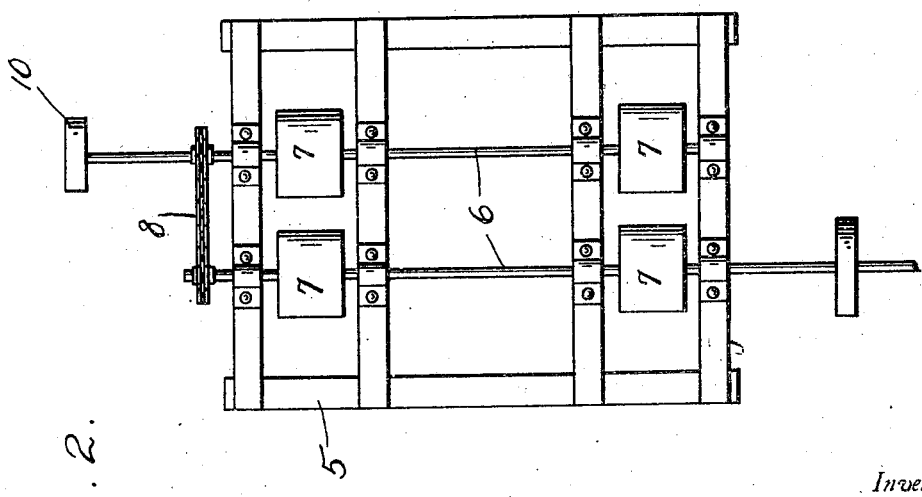

June 24, 1930. J. W. WHITE 1,766,007
AUTOMOBILE POWER TAKE-OFF DEVICE
Filed Aug. 22, 1928 3 Sheets-Sheet 3
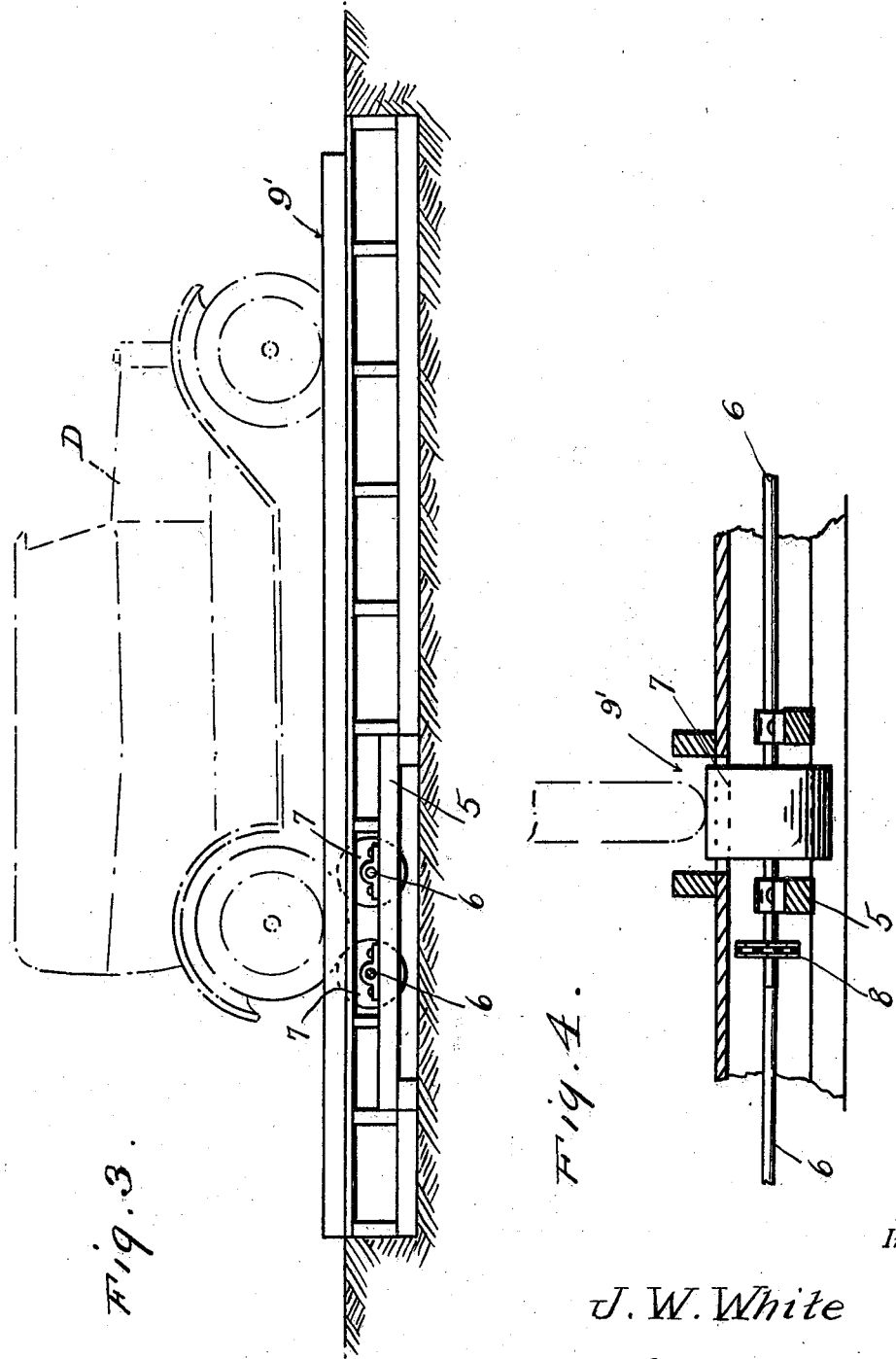
Inventor
J. W. White
By Clarence A. O'Brien
Attorney Patented June 24, 1930

1,766,007

UNITED STATES PATENT OFFICE

JAMES W. WHITE, OF BAINBRIDGE, GEORGIA, ASSIGNOR OF ONE-FOURTH TO WALLACE CALVIN WHITE, OF BAINBRIDGE, GEORGIA

AUTOMOBILE POWER-TAKE-OFF DEVICE

Application filed August 22, 1928. Serial No. 301,253.

This invention relates to new and useful improvements in automobile power take off devices and aims to provide a novel, simple and useful structure adapted to be incorporated within the floor of an automobile garage whereby to employ the power of the automobile in operating various machinery located adjacent the garage.

A device of this character is particularly adaptable for installation within garages of outlying districts where electric power is not readily accessible. However, the device is highly satisfactory for use in garages located in the city so as to permit the power of the machine to be derived for the operation of lathes, saws and other devices insomuch as the cost of operation of the various devices by use of the automobile would be considerably less than when employing city current.

Other objects will become apparent as the nature of the invention is better understood, the same comprising the novel form, combination, and arrangement of parts hereinafter more fully described, shown in the accompanying drawing and claimed.

In the drawing wherein like reference characters designate corresponding parts throughout the several views:

Figure 1 is a floor plan view of a combined automobile garage and machine shop, said garage being equipped with my improved power take off device, Figure 2 is a plan view of the power take off device per se, Figure 3 is a detail longitudinal section through the garage at one side of the power take off device, Figure 4 is a detail transverse fragmentary section therethrough, Figure 5 is an enlarged fragmentary longitudinal section through one side of the power take off unit per se, and Figure 6 is an end elevation of a device associated with the garage floor to facilitate the anchoring of the automobile to prevent its movement with respect to the device during the rotation of the rear wheels of the automobile.

Now having particular reference to the drawings A designates generally a building constructed to provide an automobile compartment B and a machine shop C. Within the floor of the garage there is installed my improved power take off device which consists of a suitable frame 5 located beneath the floor surface as clearly illustrated in Figure 5.

Arranged longitudinally within the frame 5 so as to extend transversely of the floor of the garage is a pair of spaced parallel shafts 6—6 having keyed thereto adjacent their opposite ends, the automobile rear wheel engaging power pulleys or drums 7—7. The drums 7—7 have slight spaced relation with respect to each other so as to enable the rear wheels of the automobile D to rest thereon and therebetween.

The adjacent ends of these shafts 6—6 are equipped with suitable sprocket gears over which is trained an endless chain 8. The floor of the garage directly adjacent the pulleys 7—7 is provided with longitudinal slots 9—9 through which these pulleys or drums project, see Figure 5.

The top surface of the floor in longitudinal alinement with these drums is provided with wheel guide troughs 9'—9' so as to facilitate the proper engagement of the rear wheels of the machine upon the drums as illustrated in Figures 3 and 5.

The end of the foremost shaft 6 adjacent the machine shop C extends into the shop and is equipped with a take off pulley 10 which is operatively associated with the various machines within the shop as fully illustrated in Figure 1.

The end of the rearmost shaft 6 adjacent the outer wall of the garage B extends through the wall of the garage and is equipped with various pulleys so that power may be directed to the propellor shaft of various devices located outside of the building such as saws, well drilling machine or the like.

Located upon the floor of the garage intermediate the respective pairs of pulleys or drums 7—7 is a suitable device, designated generally by the reference character 11, whereby to anchor the automobile in proper position on the said drums 7—7 to prevent movement of the vehicle during rotation of its rear wheel by action of the motor of the vehicle.

This anchoring device 11 consists of a pair of spaced vertically disposed standards 12—12 rising from the garage floor and having a shaft 13 rockably supported thereby. Splined to the shaft 13 intermediate the ends thereof is a ratchet wheel 14. A handle or operating lever 15 is fixed at one end to the shaft adjacent the ratchet wheel to facilitate the rocking of the shaft in an obvious manner. As illustrated the shaft 15 is provided with a pivotally mounted dog 16 adjacent its fixed end, this dog adapted to engage with the teeth of the ratchet wheel 14 for imparting rotary movement to said ratchet wheel. Suitably fixed to the ratchet wheel is a chain 17, said chain adapted to engage in any suitable manner with a suitable part of the vehicle, such as may be the transmission housing so that it will be seen that upon actuation of the ratchet wheel 14, the chain 17 having been fixed to the vehicle may be drawn taut for holding the vehicle stationary when disposed in position for transmitting motion from its rear wheel to the pulleys or drums 7—7. To lock the ratchet wheel 14 in a tightening position, there is provided a suitable dog 18 pivotally mounted in the garage floor in any manner, said dog adapted to engage with the teeth of the ratchet wheel for holding the same in locked position. This dog 18 is further provided with suitable foot actuated operating lever 19, said lever adapted to normally rest upon the garage floor as shown to advantage in Figure 6.

It will thus be seen that I have provided a novel, simple, and extremely useful power take off device that is well adapted for all of the purposes heretofore designated. Even though I have herein shown and described the invention as consisting of certain detail structural elements, it is nevertheless to be understood that minor changes may be made therein without affecting the spirit and scope of the appended claims.

Having thus described my invention, what I claim as new is:

1. In a power take-off device, the combination of a frame unit adapted to be located beneath the surface of the garage floor, a pair of spaced parallel shafts journaled within the frame, drums keyed to the shafts adjacent their outer ends, said drums adapted to project through slots in the garage floor so as to permit the rear wheels of a vehicle to rest thereon, longitudinally extending wheel guide troughs arranged upon the floor surface in alignment with said drums, means at certain ends of said shafts whereby the power may be taken therefrom, a pair of uprights rising from the floor intermediate the troughs, a third shaft rockably supported between said uprights, a ratchet wheel carried by said third shaft, a flexible attaching member carried by the ratchet wheel and adapted to engage with the vehicle, and an operating lever for the third shaft for actuating said ratchet wheel, the flexible connection between the ratchet wheel and the vehicle, together with the dog pivotally mounted on the floor of the garage and engageable with the teeth of the ratchet wheel, all in the manner and for the purpose set forth.

2. In a power take-off device, the combination of a frame unit adapted to be located beneath the surface of a garage floor, a pair of spaced parallel shafts journaled within the frame, drums keyed to the shafts adjacent their outer ends and adapted to project through slots in the garage floor so as to permit the rear wheels of a vehicle to rest thereon, longitudinally extending wheel guide troughs arranged upon the floor surface in alignment with said drums, means at certain ends of said shafts whereby the power may be taken therefrom, a third shaft rockably supported between said wheel guides, a ratchet wheel on the third shaft, an operating lever for the third shaft, a dog pivotally mounted on said operating lever and adapted for engagement with the teeth of the ratchet wheel, flexible means in engagement with the ratchet wheel and adapted for engagement with a stationary part of the vehicle and adapted to be taut during the rocking movement of the shaft, and a latching member carried by the floor of the garage and engageable with the ratchet wheel for holding said flexible connection in a taut position.

In testimony whereof I affix my signature.

JAMES W. WHITE.